US008182157B2

(12) United States Patent
Shattuck et al.

(10) Patent No.: US 8,182,157 B2
(45) Date of Patent: May 22, 2012

(54) THRUST BEARING ASSEMBLY

(75) Inventors: Charles W. Shattuck, West Goshen, CT (US); David R. Torlai, Torrington, CT (US); Richard F. Murphy, Torrington, CT (US)

(73) Assignee: Koyo Bearings USA LLC, Westlake, OH (US)

( * ) Notice: Subject to any disclaimer, the term of this patent is extended or adjusted under 35 U.S.C. 154(b) by 0 days.

(21) Appl. No.: 12/960,017

(22) Filed: Dec. 3, 2010

(65) Prior Publication Data

US 2011/0069923 A1    Mar. 24, 2011

Related U.S. Application Data

(63) Continuation of application No. 11/816,803, filed as application No. PCT/US2006/005789 on Feb. 17, 2006, now Pat. No. 7,845,857.

(60) Provisional application No. 60/654,916, filed on Feb. 22, 2005.

(51) Int. Cl.
    *F16C 33/46*    (2006.01)
    *F16C 33/42*    (2006.01)
(52) U.S. Cl. .................. 384/623; 384/614; 384/619
(58) Field of Classification Search .............. 384/420, 384/524, 614–615, 618–620, 623, 903; 29/898.041, 29/898.062, 898.064
    See application file for complete search history.

(56) References Cited

U.S. PATENT DOCUMENTS

| 1,353,044 A | 9/1920 | Keiper |
| 1,380,622 A | 6/1921 | Winn |
| 1,734,222 A | 11/1929 | Marles |
| 2,072,515 A | 3/1937 | Delaval-Crow |
| 2,978,282 A | 4/1961 | Fisher |
| 3,163,478 A * | 12/1964 | Pitner ..................... 384/623 |
| 3,785,710 A | 1/1974 | Alling |
| 3,913,994 A | 10/1975 | Alling et al. |
| 3,957,325 A | 5/1976 | Babb |
| 4,310,205 A | 1/1982 | Condon et al. |

(Continued)

FOREIGN PATENT DOCUMENTS

DE    2114697    10/1972

(Continued)

OTHER PUBLICATIONS

International Search Report and Written Opinion for corresponding International Application No. PCT/US06/005789 mailed on Jun. 30, 2006.

*Primary Examiner* — Marcus Charles
(74) *Attorney, Agent, or Firm* — Nelson Mullins Riley & Scarborough, LLP

(57) ABSTRACT

A thrust bearing assembly generally includes a cage and a plurality of rolling elements. The cage has first and second cage halves with each cage half having a respective radial segment with a plurality of circumferentially spaced openings. Each opening has an opening perimeter. The cage halves are interconnected with portions of the radial segments circumferentially between the plurality of openings abutting along a given plane and the respective openings aligned to defined rolling element pockets. The rolling elements are positioned in the rolling element pockets such that a centerline of each rolling element lies in or in proximity to the given plane. A flange extends along at least a portion of each opening perimeter to retain the rolling elements within a respective one of the rolling element pockets.

9 Claims, 7 Drawing Sheets

U.S. PATENT DOCUMENTS

| | | | |
|---|---|---|---|
| 4,645,435 A | 2/1987 | Sugimoto | |
| 5,509,737 A | 4/1996 | Waskiewicz et al. | |
| 6,478,467 B1 * | 11/2002 | Graber | 384/51 |
| 6,883,970 B2 | 4/2005 | Horley | |
| 7,033,083 B2 | 4/2006 | Obayashi et al. | |
| 7,513,043 B2 | 4/2009 | Obayashi et al. | |

FOREIGN PATENT DOCUMENTS

| | | | |
|---|---|---|---|
| FR | 2242595 | | 3/1975 |
| JP | 2005-69322 A | * | 3/2005 |

* cited by examiner

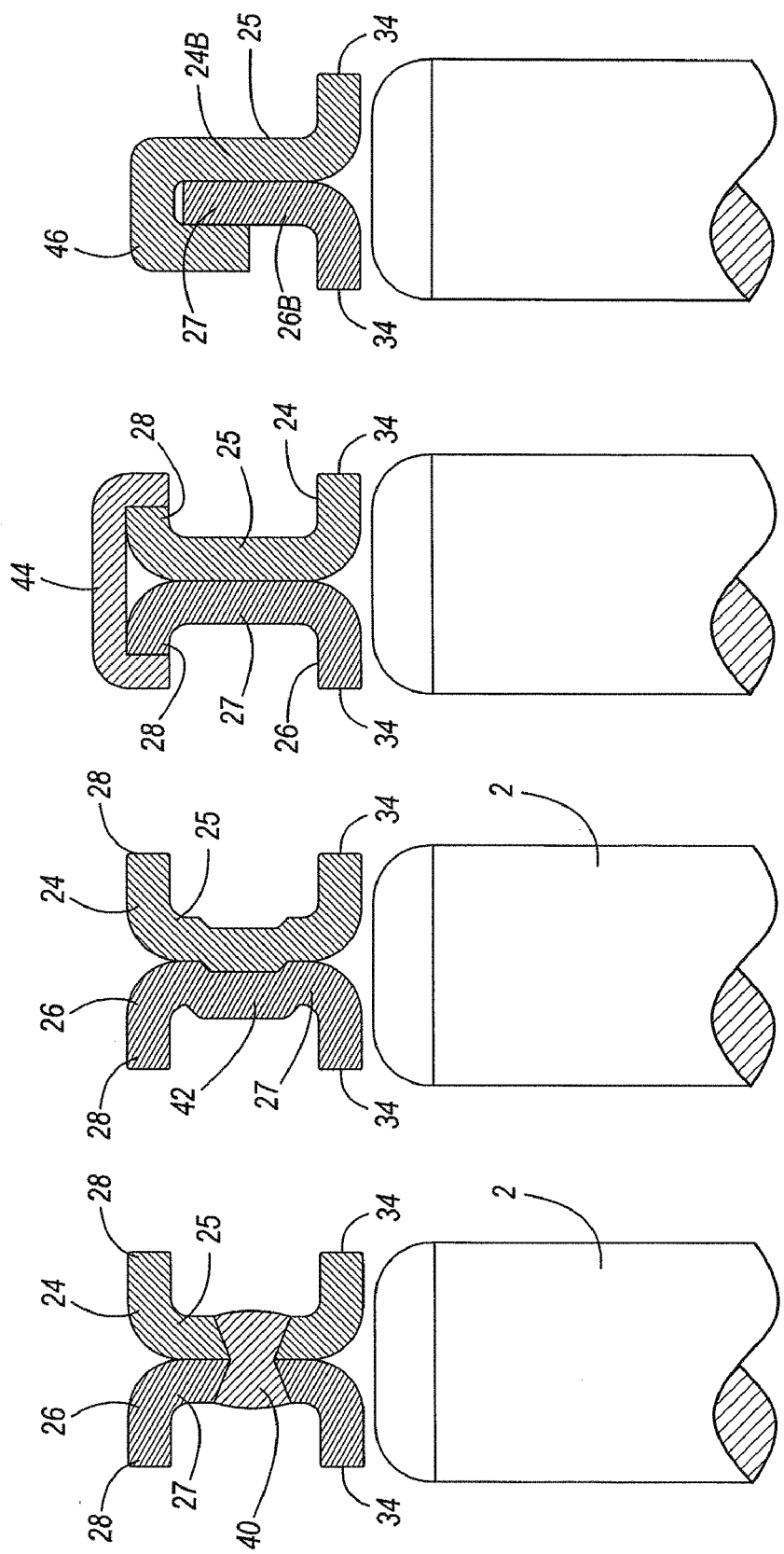

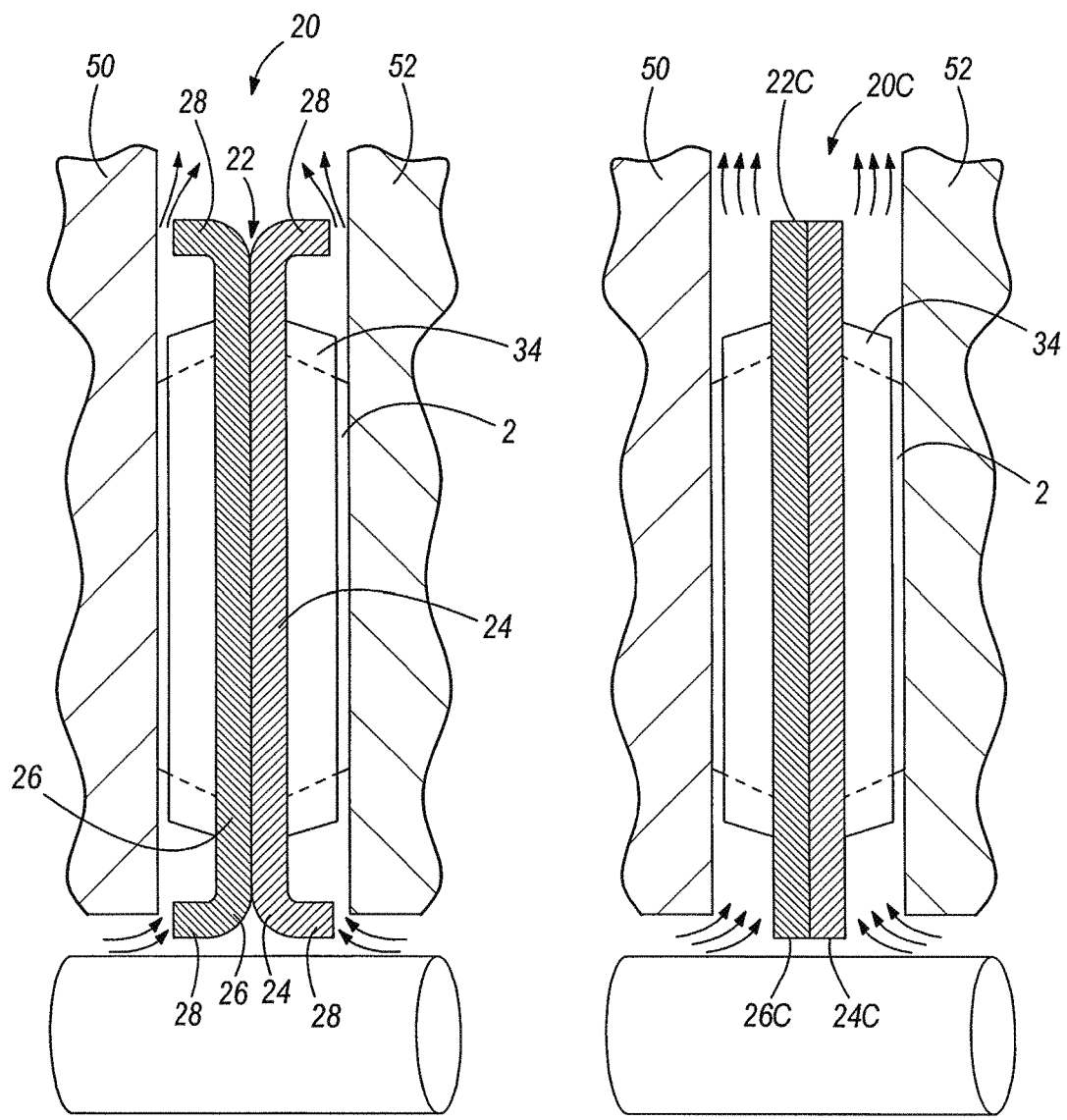
FIG. 9  FIG. 10

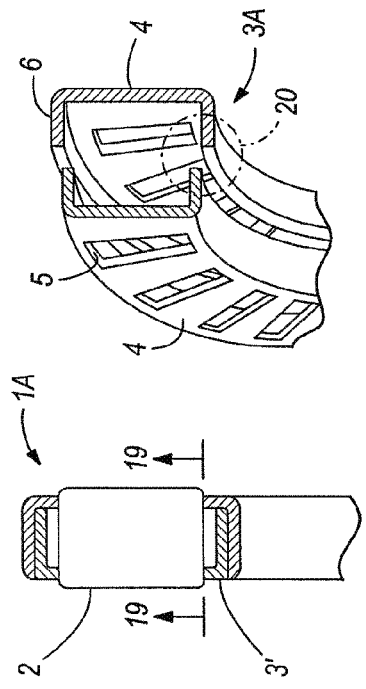
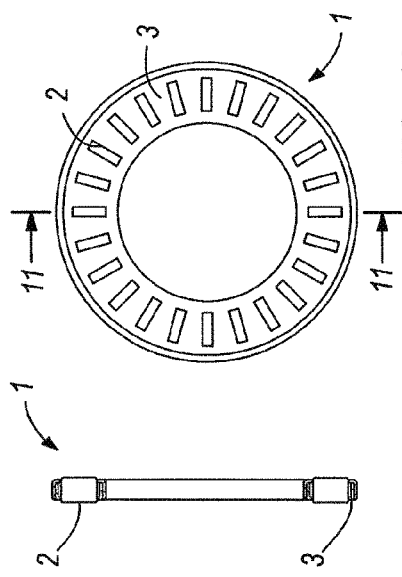
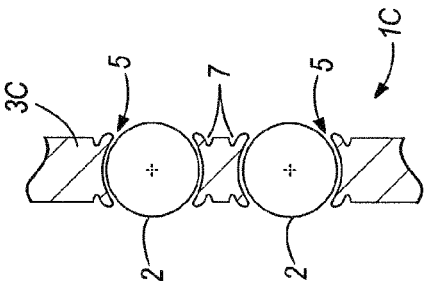
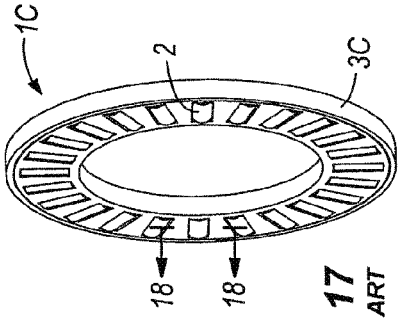

THRUST BEARING ASSEMBLY

CROSS REFERENCE TO OTHER APPLICATIONS

This application is a continuation of U.S. patent application Ser. No. 11/816,803, filed Aug. 21, 2007, which is a 371 application of PCT/US2006/005789, filed Feb. 17, 2006, which claims priority to U.S. Provisional Patent Application No. 60/654,916, filed on Feb. 22, 2005, the entire contents of which are hereby incorporated by reference.

FIELD OF THE INVENTION

The present invention relates to a thrust bearing assembly and in particular to a needle roller thrust bearing assembly.

BACKGROUND OF THE INVENTION

Referring to FIGS. 11 and 12, an example of a prior art needle roller thrust bearing 1 is shown. The bearing 1 includes a plurality of cylindrical rolling elements 2 arranged radially from a center of rotation. The rolling elements 2 are retained and guided by a bearing cage 3, which forms the primary structure of the bearing 1.

There are several types of construction currently used to produce metallic needle roller bearing cages 3. FIGS. 13 and 14 show a thrust bearing 1A with a cage 3A that is constructed of two halves 4. Each half 4 has rectangular window openings 5 which are slightly smaller in width than the diameter of the rolling elements 2. Each cage half 4 also has circumferential flanges 6 which are directed inwardly towards the opposite member. When joined together, these two cage halves 4 form a box which provides structural integrity for the assembly, along with guidance for the rolling elements 2 and their retention in both directions.

A prior art thrust bearing 1B with a cage 3B having another construction is shown in FIGS. 15 and 16. In this construction, the cage 3B is formed from a single piece of metal into a shape which, along with specially shaped openings, retains and guides the rolling elements 2. In cross-section, this type of cage 3B has a shape similar to that of the Greek letter sigma (Σ).

Another thrust bearing 1C having a cage 3C of yet another construction is shown in FIGS. 17 and 18. Here, the cage 3C has a material thickness close to the diameter of the rolling elements 2 and has rectangular openings 5 to accept the rolling elements 2. Retention is provided by staking 7 or otherwise forming the cage face near the openings 5 so that these are made smaller than the diameter of the rolling element 2.

SUMMARY OF THE INVENTION

In one embodiment, a thrust bearing assembly includes a cage and a plurality of rolling elements. The cage has first and second cage halves with each cage half having a respective radial segment with a plurality of circumferentially spaced openings. Each opening has an opening perimeter. The cage halves are interconnected with portions of the radial segments circumferentially between the plurality of openings abutting along a given plane and the respective openings aligned to define rolling element pockets. The rolling elements are positioned in the rolling element pockets such that a centerline of each rolling element lies in or in proximity to the given plane. A flange extends along at least a portion of each opening perimeter to retain the rolling elements within a respective one of the rolling element pockets. The flange may include a smooth rolled surface adjacent to each rolling element.

In another embodiment, a thrust bearing assembly includes a cage and a plurality of rolling elements. The cage has first and second cage halves with each cage half having a respective radial segment with a plurality of openings. Each opening has an opening perimeter and the cage halves are interconnected with portions of the radial segments abutting along a given plane. The respective openings are aligned to define rolling element pockets. The rolling elements are positioned in the rolling element pockets such that a centerline of each rolling element lies in or in proximity to the given plane. A flange extends along the entire perimeter of each respective opening to guide and retain the rolling elements within a respective one of the rolling element pockets.

BRIEF DESCRIPTION OF THE DRAWINGS

FIG. 5 is a cross-sectional view along the lines 5-5 in FIG. 1;

FIGS. 6-8 are cross-sectional views similar to FIG. 5 illustrating other embodiments of a thrust bearing assembly;

FIG. 9 is a cross-sectional view illustrating the needle roller thrust bearing assembly of FIG. 1 positioned between a pair of bearing surfaces;

FIG. 10 is a cross-sectional view similar to FIG. 9 showing another embodiment of a thrust bearing assembly;

FIG. 11 is a cross-sectional view along line 11-11 in FIG. 12;

FIG. 12 is a front elevation view of a prior art thrust bearing;

FIG. 13 is a partial cross-sectional view of an alternative prior art thrust bearing;

FIG. 14 is a partial isometric view of the cage of the thrust bearing of FIG. 13;

FIG. 15 is an isometric view of a cage of another prior art thrust bearing;

FIG. 16 is a partial cross-sectional view of the alternative thrust bearing using the cage of FIG. 15;

FIG. 17 is an isometric view of yet another alternative prior art thrust bearing;

FIG. 18 is a cross-sectional view along the line 18-18 in FIG. 17;

DETAILED DESCRIPTION

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
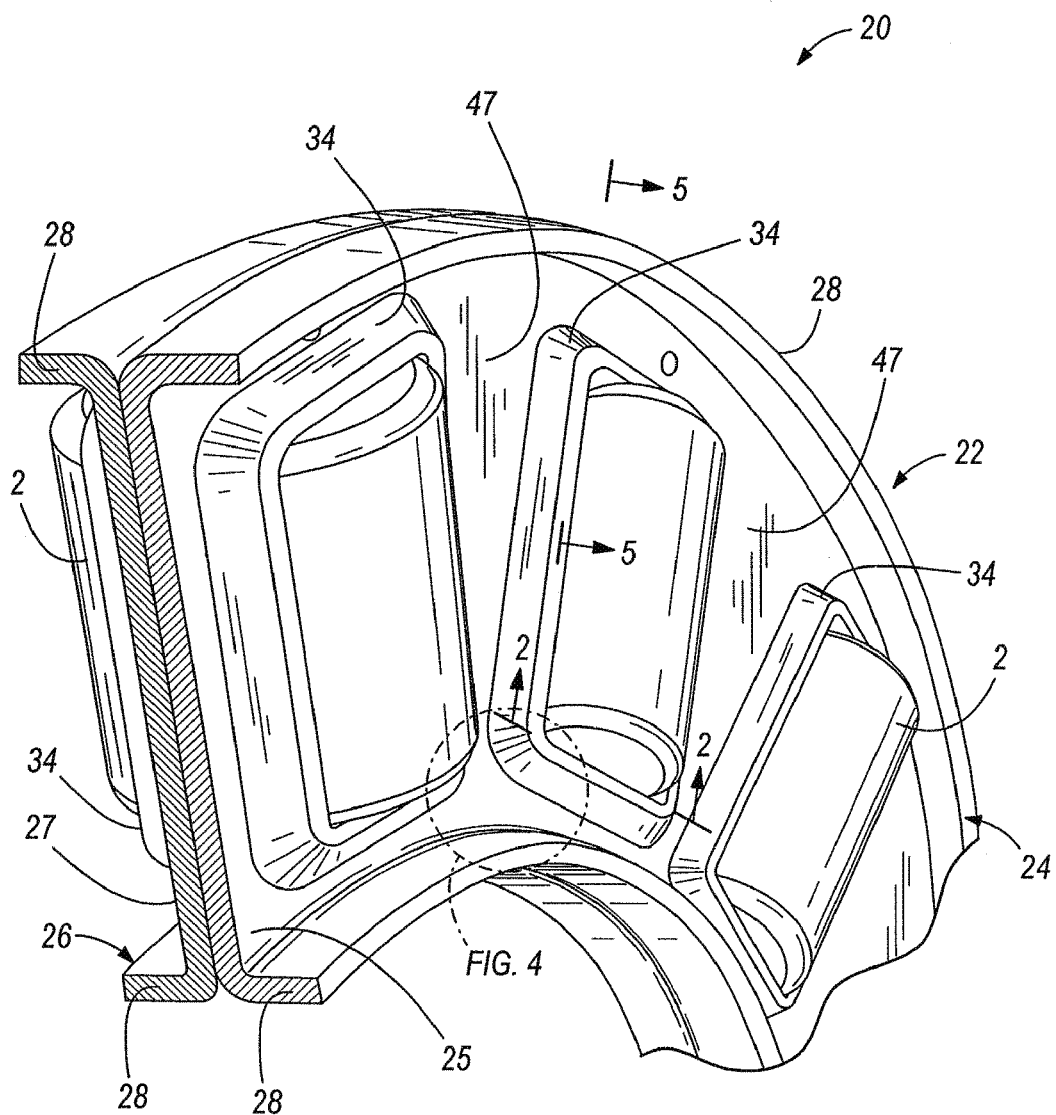
FIG. 1 is a partial isometric view of a needle roller thrust bearing assembly that is a first embodiment of the present invention.
Figure 2:
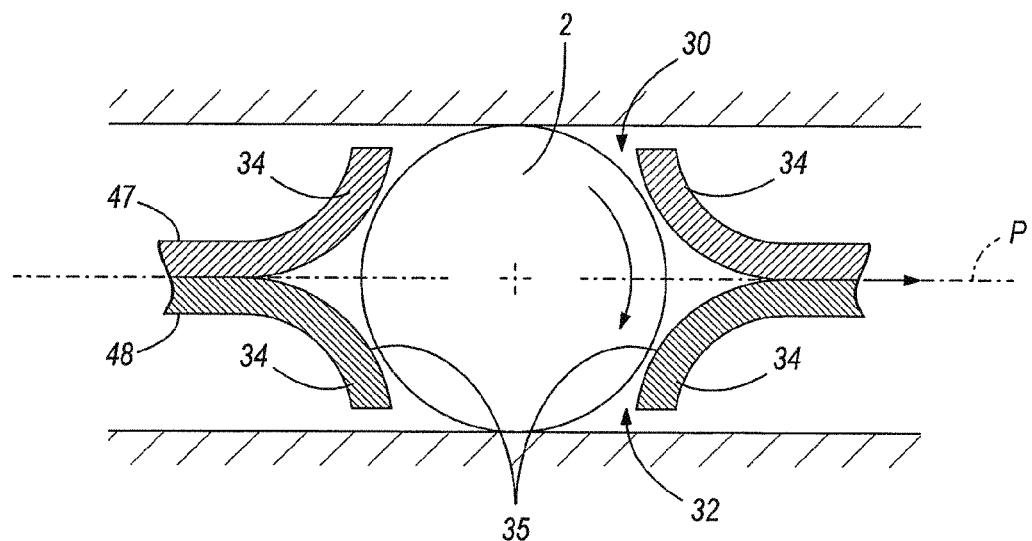
FIG. 2 is a cross-sectional view along the line 2-2 in FIG. 1.

Referring to FIGS. 1 and 2, a needle roller thrust bearing assembly 20 that is a first embodiment of the present invention is shown. The thrust bearing assembly 20 includes a cage 22 supporting a plurality of preferably cylindrical rolling elements 2 arranged radially from a center of rotation (not shown). The cage 22 comprises two cage halves 24, 26. Each cage half 24, 26 includes a radially extending segment 25, 27 respectively with circumferentially spaced openings 30, 32 respectively. Each radially extending segment 25, 27 includes portions 47, 48 circumferentially between the plurality of openings 30, 32.

The openings 30, 32 are preferably generally rectangular and configured to receive the rolling elements 2. The cage halves 24, 26 are interconnected with the openings 30, 32 radially and circumferentially aligned and with at least portions such as portions 47, 48 of the radially extending segments 25, 27 abutting one another along a plane P. The centerline of each of the rolling elements 2 lies in or in proximity to the plane P. In this embodiment, circumferential flanges 28 are provided at the inner and outer diameters of the radial portions 25, 27 to provide a piloting surface for the thrust bearing assembly 20 and to provide additional structural rigidity for the cage 22.

Figure 19:
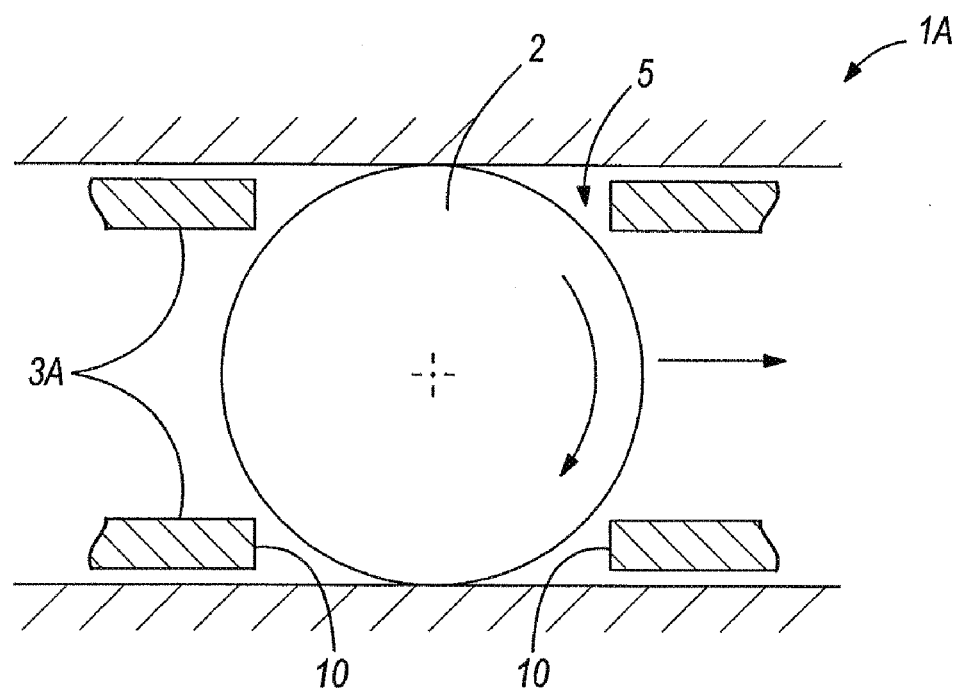
FIG. 19 is a cross-sectional view along the line 19-19 in FIG. 13.

Each opening 30, 32 has a flange 34 about at least a portion of or the entire opening perimeter. Each flange 34 extends outwardly from the plane P. The flanges 34 are formed in such a way as to guide and retain the rolling elements 2. An advantage of this design over the prior art cage 3 constructions is that any portion of the cage 22 of the present invention that contacts the rolling elements 2 has a smooth rolled and formed surface. In contradistinction, as shown in FIG. 19, the surfaces that contact the rolling elements 2 of the cage 3A are pierced such that the opening 5 is defined by rough pierced surfaces 10 which can interfere with proper lubrication and also lead to wear.

FIG. 2 illustrates how the configuration of the thrust bearing assembly 20 allows an effective lubricant film to be developed. Specifically, lubricant can be captured in the generally triangular area defined between the rolling element 2 and the two abutting cage halves 24, 26. The abutting portions 47 and 48 close off the triangular area between the flanges 34 and prevent the lubricant from escaping circumferentially from adjacent the rolling element 2. Lubricant that either splashes into or is carried by adhesion to the rolling element 2 into this generally triangular area will tend to accumulate in this area and help promote a hydrodynamic lubricant film between the rolling element 2 and the surfaces 35 of the flanges 34. The smooth, generally convex surfaces 35 of the flanges 34 will minimize the "scraping" of lubricant off the rolling element 2 and will help maintain the presence of lubricant in the generally triangular area adjacent the rolling element 2. The smooth surfaces 35 also minimize direct contact between the rolling elements 2 and the cage 22, thereby reducing friction and wear.

Figure 3:
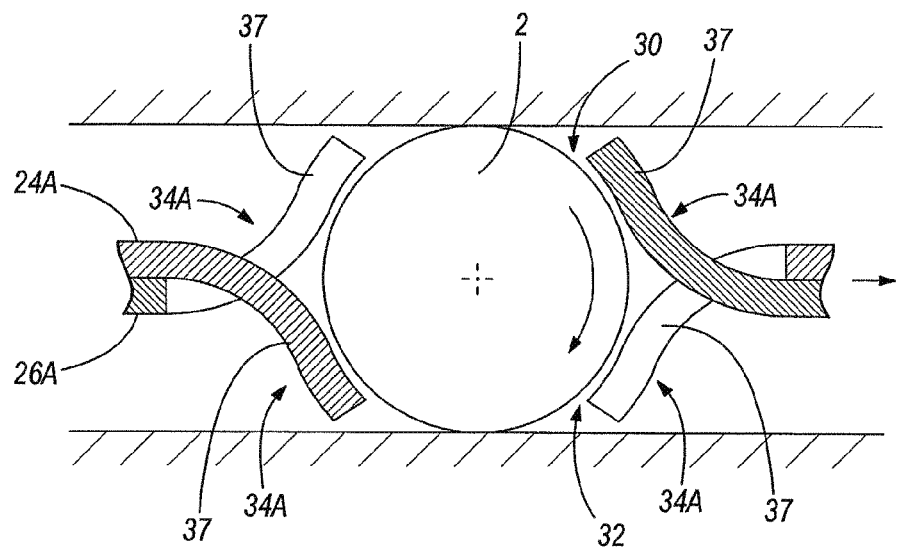
FIG. 3 is a cross-sectional view similar to FIG. 2 showing another embodiment of a thrust bearing assembly.

Another form of the flange construction for rolling element openings 30, 32 is shown in FIG. 3. In this case, the cage halves 24A, 26A still abut on the plane P extending along or approximately along the centerline of the rolling elements 2, however, the flanges 34A along the length of the rolling elements 2 are divided into separate tabs 37. These tabs 37 are formed to present a smooth, generally conforming surface to the rolling elements, which is a variation of the smooth, generally convex surfaces 35 shown in FIG. 2. However, the tabs 37 are directed towards the opposite side of the rolling elements 2 rather than the closest side. In order to secure retention of the rolling elements in both directions, the tabs 37 are arranged so as to alternate on a portion of the perimeter such as along the length of the rolling elements 2. This sturdier construction allows a greater length of flange 34A. This additional length allows for greater flexibility in the shape of the flange 34A and is particularly useful for bearing assembly 20 with rolling elements having smaller diameters and that have tighter space restrictions for the cage 22.

Figure 4:
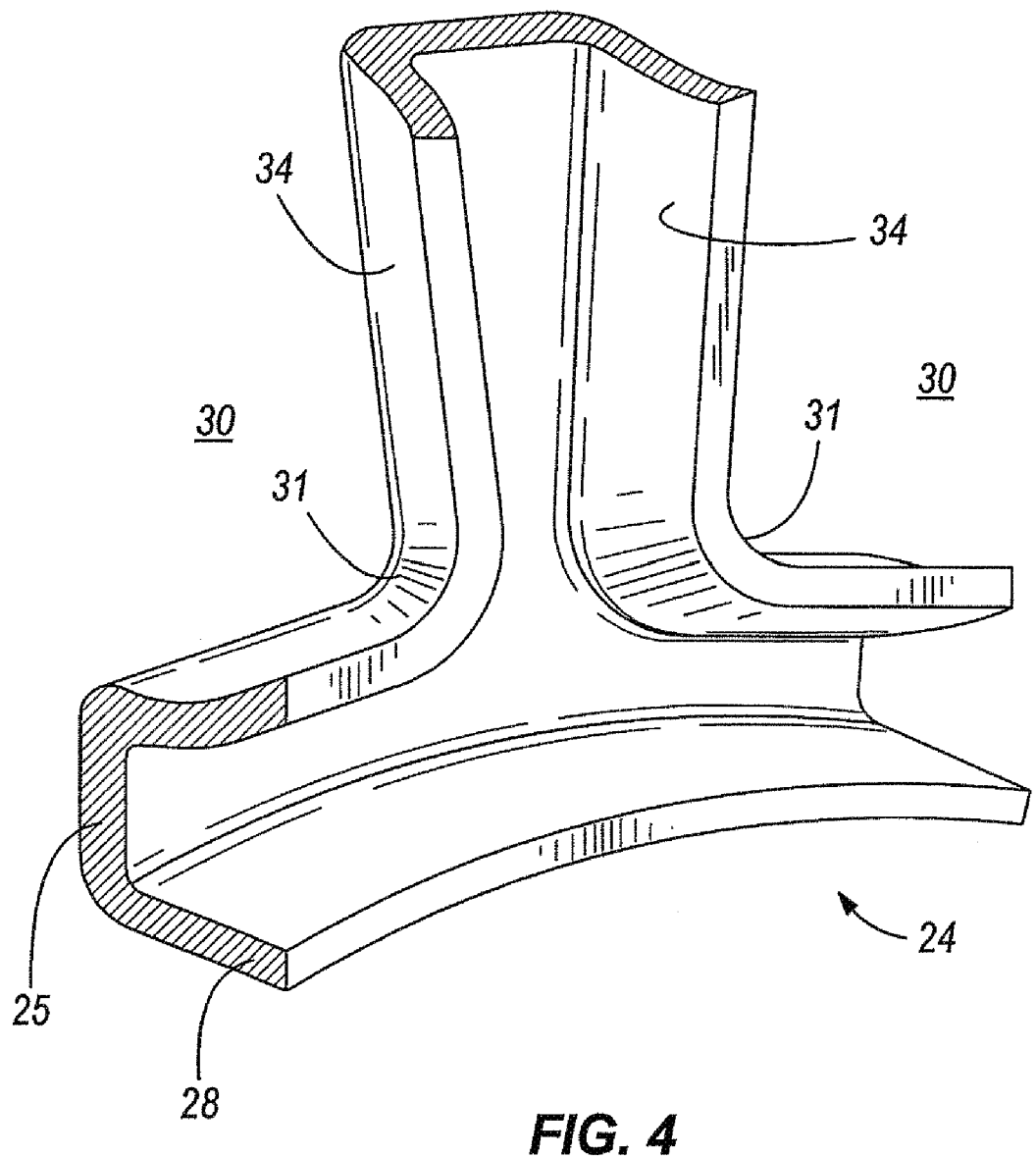
FIG. 4 is an exploded view of a portion of the cage as indicated by the circle 4 in FIG. 1 with the rolling elements removed for clarity.
Figure 20:
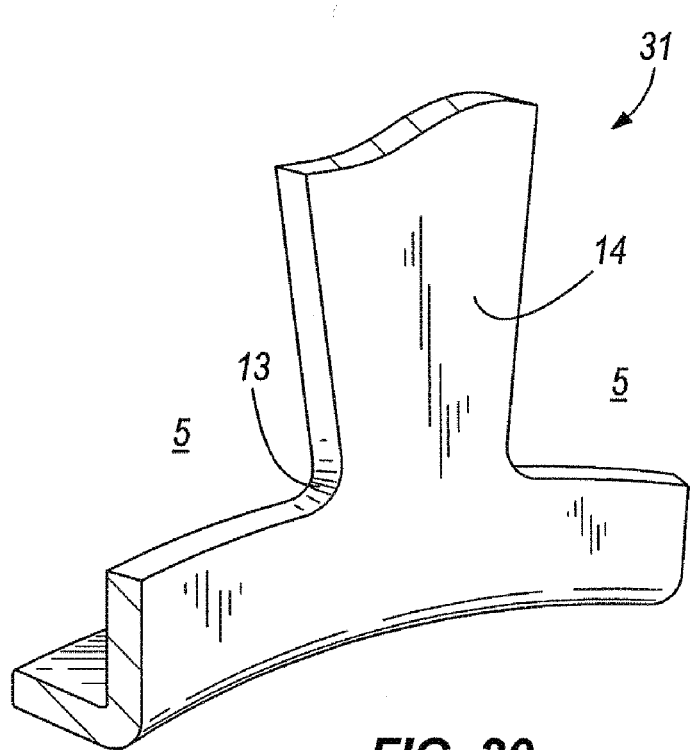
FIG. 20 is an exploded view of a portion of the cage as indicated by the circle 20 in FIG. 14.

In addition to improved wear and lubrication, another advantage of the cage 22 of thrust bearing assembly 20 is the substantially greater strength it provides compared to existing types of cage construction. This is particularly important in those areas with high concentrations of stress, such as the corners of the cage openings. FIG. 20 shows a portion of a prior art cage 3A, taken near the inner diameter. It can be seen that the corners 13 of the cage openings 5 must be at right angles and relatively sharp to clear the rolling elements. The trapezoidal shape of the cage bars 14 between the openings 5 exacerbates this situation in the prior art designs because there is minimal cage material to resist stresses caused by radial and torsional loads on the cage. Referring to FIG. 4, the flanges 34 of the thrust bearing assembly 20 includes a continuous surface at the corners 31 of the generally rectangular openings 30, 32. This structure can increase the cage strength in two ways. First, the flanges 34 provide additional material all around the openings 30 for the rolling elements 2. In the areas of high stress, such as corners 31 near the inner diameter, the flanges 34 can as much as double the amount of material available to resist these stresses. The cage openings 30 are further strengthened by the actual shape of the flanges 34. The flanges 34 are designed in such a way that the stresses are directed away from the corners 31 of the openings 30. The combination of additional material and optimized stress flow results in cage strength that is several times greater than that of the prior art constructions.

There are several possible ways to interconnect the two cage halves 24, 26 to form the rigid cage 22. Using the embodiment of the sealed bearing assembly 20 as shown in FIG. 3, the rolling elements 3 can be snapped past the tabs 37 to join the cage halves 24A, 26A and form a unitary thrust bearing assembly 20.

Several additional examples of interconnecting the cage halves 24, 26 are shown in FIGS. 5-8, however, other methods may also be utilized. Referring to FIG. 5, the cage halves 24, 26 are spot welded 40 at various points along the abutting radial portions 25 and 27. FIG. 6 illustrates a mechanical joint 42 created by partially piercing the radial portions 25, 27 and locking the two halves 24, 26 together. Referring to FIG. 7, a circumferential band 44 is secured to the inner and/or outer diameters of the cage halves 24, 26 about the inner or outer flanges 28 to secure the halves 24, 26 together. In the embodiment shown in FIG. 8, one of the cage halves 26B does not have a flange, but instead terminates in the radial portion 27. The other cage half 24B has a flange 46 extending from the radial portion 25 that extends toward and wraps around the radial portion 27. While the flange 46 is illustrated as being along the cage outer diameter, it is also possible to provide the flange 46 along the cage inner diameter.

Another advantage of the current invention is that various combinations of differently sized circumferential flanges 28 at the inner and outer diameter of the cage 22 can be used to control lubricant flow within the bearing assembly 20. In some cases it is desirable to restrict or partially restrict the lubrication flow, while in other cases it is desirable to allow as much flow as possible. For example, FIG. 9 shows the thrust bearing assembly 20 of FIG. 1 positioned between two structures 50 and 52. As can be seen, the inner and outer diameter circumferential flanges 28 restrict the radial oil flow past the bearing assembly 20. FIG. 10 shows another embodiment thrust bearing assembly 20C positioned between structures 50, 52. The thrust bearing assembly 20C includes a cage 22C with interconnected halves 24C and 26C. Both halves 24C and 26C are without flanges which thereby allows more oil flow past the bearing assembly 20C. Other designs could incorporate partial or shorter flanges 28 to partially restrict flow.

The present invention addresses the essential requirements of a thrust bearing cage, namely, structure, guidance and retention, in a manner than greatly improves both the strength, rigidity, lubrication advantages, and the efficiency of the bearing assembly. Further, a low profile of the bearing assembly can be achieved.

Various features and advantages of the invention are set forth in the following claims.

What is claimed is:

1. A thrust bearing assembly comprising:
   a cage having first and second cage halves, each cage half having a respective radial segment with an inner surface, an outer surface and a plurality of circumferentially spaced openings, each opening having an opening perimeter, the cage halves being interconnected such that the respective openings are aligned to define rolling element pockets;
   a plurality of rolling elements positioned in the rolling element pockets; and
   a flange extending along at least a first portion of each opening perimeter to retain the rolling elements within a respective one of the rolling element pockets,
   wherein each flange includes a generally concave outer surface and a generally convex inner surface, the generally convex inner surface of each flange being disposed in a facing relationship with an outer surface of a respective rolling element.

2. The thrust bearing assembly of claim 1, wherein portions of the radial segments circumferentially between the plurality of openings abut along the inner surfaces of the first and second cage halves.

3. The thrust bearing assembly of claim 2, wherein a centerline of each rolling element lies in a given plane defined by the abutting inner surfaces of the first cage half and the second cage half.

4. The thrust bearing assembly of claim 3, wherein at least one cage half includes an outer flange along an outer radius, the flange extending away from the given plane.

5. The thrust bearing assembly of claim 3, wherein at least one cage half includes an inner flange along an inner radius, the flange extending away from the given plane.

6. The thrust bearing assembly of claim 1, wherein the cage halves are joined together by one of spot welding, a mechanical joint, a circumferentially extending clamping band, and a portion of one cage half overlapping and clamping a portion of the other cage half.

7. The thrust bearing assembly of claim 1, wherein each flange extends along the entire perimeter of a respective opening.

8. The thrust bearing assembly of claim 1, wherein the openings are generally rectangular.

9. The thrust bearing assembly of claim 8, wherein each flange includes a continuous surface at corners of the generally rectangular openings.

* * * * *